United States Patent
Wei et al.

(10) Patent No.: US 12,267,405 B2
(45) Date of Patent: Apr. 1, 2025

(54) COMMUNICATIONS DEVICE, INFRASTRUCTURE EQUIPMENT AND METHODS

(71) Applicant: Sony Group Corporation, Tokyo (JP)

(72) Inventors: Yuxin Wei, Basingstoke (GB); Vivek Sharma, Basingstoke (GB); Hideji Wakabayashi, Basingstoke (GB); Yassin Aden Awad, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/768,234

(22) PCT Filed: Sep. 28, 2020

(86) PCT No.: PCT/EP2020/077126
§ 371 (c)(1),
(2) Date: Apr. 12, 2022

(87) PCT Pub. No.: WO2021/083595
PCT Pub. Date: May 6, 2021

(65) Prior Publication Data
US 2024/0121328 A1    Apr. 11, 2024

(30) Foreign Application Priority Data
Oct. 30, 2019 (EP) ................................. 19206366

(51) Int. Cl.
*H04L 12/861* (2013.01)
*H04L 69/326* (2022.01)

(52) U.S. Cl.
CPC ............................... *H04L 69/326* (2013.01)

(58) Field of Classification Search
CPC ............. H04L 69/326; H04L 49/9057; H04L 49/3072; G06N 3/084
See application file for complete search history.

(56) References Cited

U.S. PATENT DOCUMENTS 8,902,927 B2   12/2014 Duncan Ho
10,958,506 B2 *  3/2021 Pignataro ............... H04L 41/12
(Continued)

FOREIGN PATENT DOCUMENTS

CN    101682464 A    3/2010
CN    201444641 U    4/2010
(Continued)

OTHER PUBLICATIONS

International Search Report and Written Opinion mailed on Feb. 2, 2021, received for PCT Application PCT/EP2020/077126, Filed on Sep. 28, 2020, 15 pages.
(Continued)

*Primary Examiner* — Jay P Patel
(74) *Attorney, Agent, or Firm* — XSENSUS LLP

(57) ABSTRACT

A method of transmitting data by a transmitting entity in a wireless communications network to a receiving entity, the method comprising receiving, at the transmitting entity, data for transmission via a wireless access interface of the wireless communications network, dividing the data into portions for transmission, forming from each portion of data for each of one or more protocol layers one or more protocol data units, the one or more protocol data units being formed for each layer according to a protocol applied by the layer for transmitting the protocol data unit and each of the protocol data units for each layer includes a header, and transmitting the data via the wireless access interface by processing each of the one or more protocol data units via each of the one or more protocol layers.

15 Claims, 9 Drawing Sheets

(56) References Cited

U.S. PATENT DOCUMENTS

| | | | |
|---|---|---|---|
| 11,153,271 B2* | 10/2021 | Yang | H04L 69/326 |
| 11,153,272 B2* | 10/2021 | Yang | H04L 61/2592 |
| 11,792,302 B2* | 10/2023 | Zhang | H04L 69/04 |
| 2009/0003283 A1 | 1/2009 | Meylan | |
| 2009/0141670 A1 | 6/2009 | Duncan Ho | |
| 2009/0310537 A1 | 12/2009 | Bucknell | |
| 2019/0182211 A1* | 6/2019 | Yang | H04L 69/326 |
| 2019/0236598 A1* | 8/2019 | Padmanabhan | G06Q 20/389 |
| 2019/0372929 A1* | 12/2019 | Yang | H04L 69/326 |
| 2022/0150973 A1* | 5/2022 | Lim | H04W 72/1268 |
| 2022/0159099 A1* | 5/2022 | Zhang | H04L 69/04 |
| 2022/0345938 A1* | 10/2022 | Gupta | H04W 88/10 |

FOREIGN PATENT DOCUMENTS

| | | |
|---|---|---|
| CN | 101785280 A | 7/2010 |
| CN | 101841857 A | 9/2010 |
| CN | 107222890 A | 9/2017 |
| CN | 109716728 A | 5/2019 |
| CN | 109792603 A | 5/2019 |
| KR | 20180134731 A | 12/2018 |
| SG | 85329 A1 | 1/2002 |
| WO | 2018/142366 A1 | 8/2018 |

OTHER PUBLICATIONS

3GPP, "NR; NR and NG-RAN Overall Description; Stage 2 (Release 15)", 3GPP TS 38.300 V15.2.0, Jun. 2018, pp. 1-87.

Holma et al., "LTE for UMTS OFDMA and SC-FDMA Based Radio Access", John Wiley & Sons, 2009, pp. 25-27.

3GPP, "NR; Packet Data Convergence Protocol (PDCP) specification (Release 15)", 3GPP TS 38.323 V15.6.0, Jun. 2019, pp. 1-26.

3GPP, "E-UTRA and NR; Service Data Adaptation Protocol (SDAP) specification (Release 15)", 3GPP TS 37.324 V15.1.0, Sep. 2018, pp. 1-13.

3GPP, "NR; Radio Link Control (RLC) protocol specification (Release 15)", 3GPP TS 38.322 V15.5.0, Mar. 2019, pp. 1-33.

3GPP, "NR; Medium Access Control (MAC) protocol specification (Release 15)", 3GPP TS 38.321 V15.6.0, Jun. 2019, pp. 1-78.

Dahlman, E. et al., "5G NR: The Next Generation Wireless Access Technology", Academic Press, 1st Edition—Aug. 9, 2018, 4 pages.

* cited by examiner

COMMUNICATIONS DEVICE, INFRASTRUCTURE EQUIPMENT AND METHODS

CROSS-REFERENCE TO RELATED APPLICATIONS

The present application is based on PCT filing PCT/EP2020/077126, filed Sep. 28, 2020, which claims priority to EP 19206366.7, filed Oct. 30, 2019, the entire contents of each are incorporated herein by reference.

BACKGROUND

Field

The present disclosure relates to communications devices, infrastructure equipment and methods for the transmission and reception of data in a wireless communications network and for the generation of a model for selecting data transmission formats.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to support communications routinely and efficiently with a wider range of devices associated with a wider range of data traffic profiles and types than current systems are optimised to support. For example it is expected that future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new Radio Access Technology (RAT) systems [1], as well as future iterations/releases of existing systems, to efficiently support connectivity for a wide range of devices associated with different applications and different characteristic data traffic profiles.

An example of such a new service is referred to as Ultra Reliable Low Latency Communications (URLLC) services which, as its name suggests, requires that a data unit or packet be communicated with a high reliability and with a low communications delay. URLLC type services therefore represent a challenging example for both LTE type communications systems and 5G/NR communications systems.

The increasing use of different types of communications devices associated with different traffic profiles gives rise to new challenges for efficiently handling communications in wireless telecommunications systems that need to be addressed.

SUMMARY

The present disclosure can help address or mitigate at least some of the issues discussed above.

Embodiments of the present technique can provide a method of transmitting data by a transmitting entity in a wireless communications network to a receiving entity. The transmitting entity may be a communications device (user equipment) or an infrastructure equipment of a wireless communications network and correspondingly the receiving entity may be the other of the communications device and the infrastructure equipment so that the technique can be used on both the uplink or the downlink. Alternatively, both the transmitting entity and the receiving entity may be a communications device (user equipment), for example within a device-to-device or peer-to-peer network. The method comprising receiving, at the transmitting entity, data for transmission via a wireless access interface of the wireless communications network, dividing the data into portions for transmission, forming from each portion of data for each of one or more protocol layers one or more protocol data units, the one or more protocol data unit being formed for each layer according to a protocol applied by the layer for transmitting the protocol data unit and each of the protocol data units for each layer includes a header, and transmitting the data via the wireless access interface by processing each of the one or more protocol data units via each of the one or more protocol layers. The forming from each portion of the data for each of the one or more protocol layers the one or more protocol data units comprises determining a value of one or more input parameter, determining a header format for each of the one or more protocol layers based on the value of each of the one or more input parameters, forming the one or more protocol data units for each of the one or more protocol layers in accordance with each of the determined header formats, and transmitting the one or more protocol data units for each of the one or more protocols to the receiving entity. According to example embodiments the determining the value of the one or more input parameters and determining the header format for the one or more protocol data units of each of the one or more protocol layers is done dynamically for each of the portions of data to be transmitted.

Embodiments of the present technique can provide a dynamic adaptation of a format of the headers of protocol data units formed for transmitting data via one or more protocol layers using a machine learning technique to select the header format based on currently experienced values of one or more input parameters. Thus based on the value of each of the one or more input parameters a machine learning or artificial intelligence circuit applies a trained configuration to select the header format dynamically in accordance with for example currently experienced radio conditions. Accordingly redundancy included in a protocol data unit can be reduced to a minimum using a machine learning technique.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and.

DETAILED DESCRIPTION OF THE EMBODIMENTS

Long Term Evolution Advanced Radio Access Technology (4G)

Figure 1:
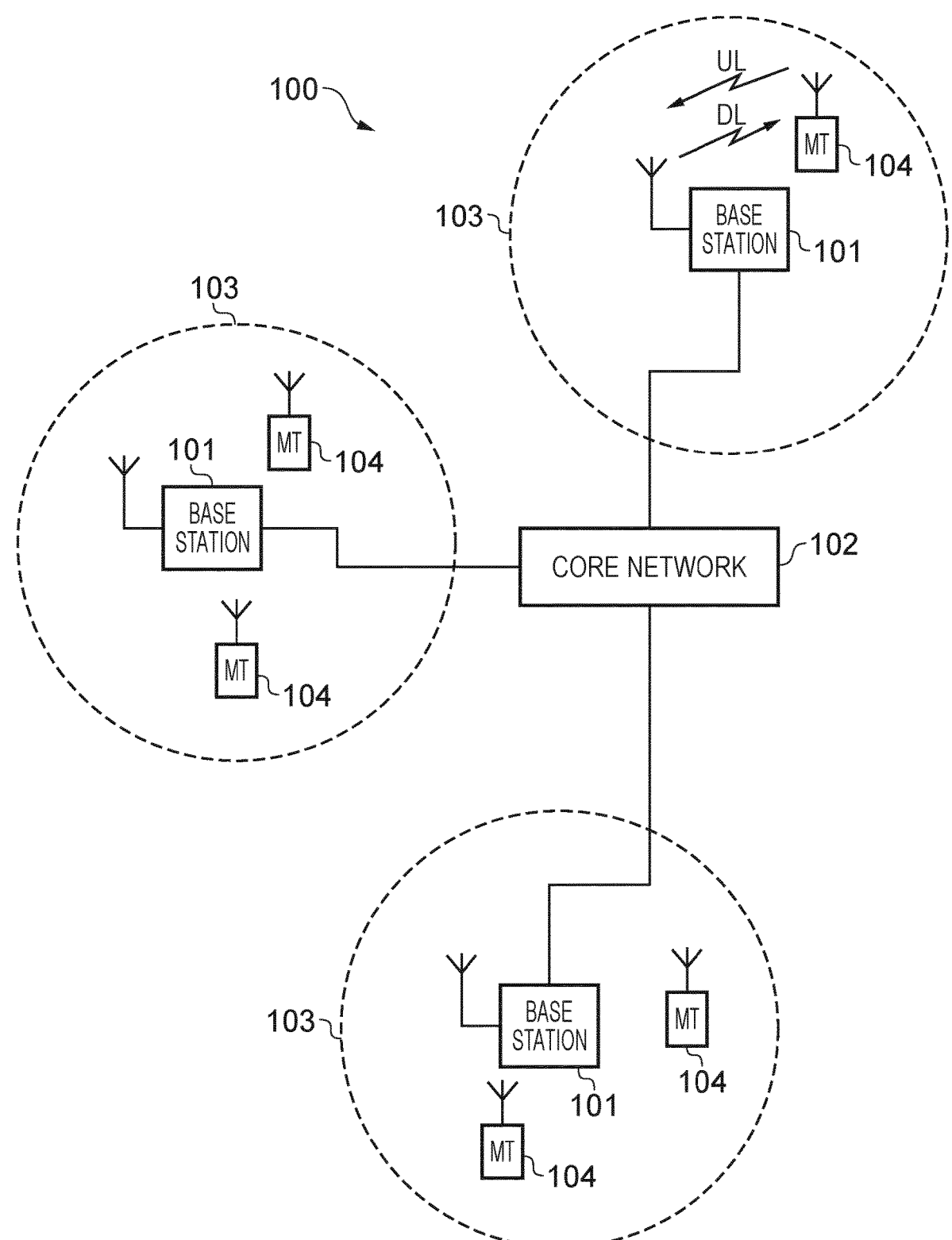
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from communications devices 104. Data is transmitted from the base stations 101 to the communications devices 104 within their respective coverage areas 103 via a radio downlink Data is transmitted from the communications devices 104 to the base stations 101 via a radio uplink. The core network part 102 routes data to and from the communications devices 104 via the respective base stations 101 and provides functions such as authentication, mobility management, charging and so on. Communications devices may also be referred to as mobile stations, user equipment (UE), user terminals, mobile radios, terminal devices, and so forth. Base stations, which are an example of network infrastructure equipment/network access nodes, may also be referred to as transceiver stations/nodeBs/e-nodeBs, g-nodeBs (gNB) and so forth. In this regard different terminology is often associated with different generations of wireless telecommunications systems for elements providing broadly comparable functionality. However, example embodiments of the disclosure may be equally implemented in different generations of wireless telecommunications systems such as 5G or new radio as explained below, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
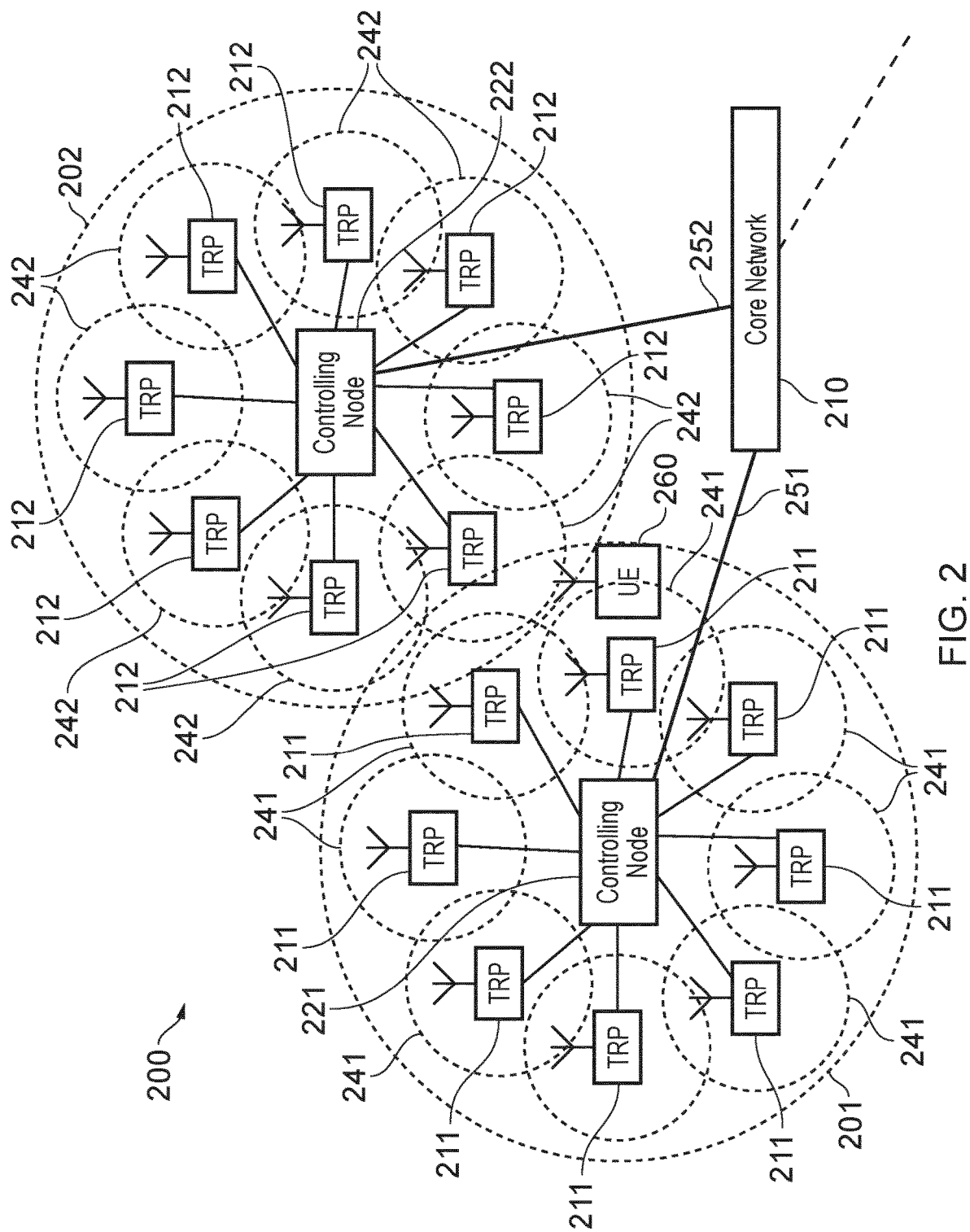
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless communications network/system 200 based on previously proposed approaches which may also be adapted to provide functionality in accordance with embodiments of the disclosure described herein. The new RAT network 200 represented in FIG. 2 comprises a first communications cell 201 and a second communications cell 202. Each communications cell 201, 202, comprises a controlling node (centralised unit) 221, 222 in communication with a core network component 210 over a respective wired or wireless link 251, 252. The respective controlling nodes 221, 222 are also each in communication with a plurality of distributed units (radio access nodes/remote transmission and reception points (TRPs)) 211, 212 in their respective cells. Again, these communications may be over respective wired or wireless links. The distributed units 211, 212 are responsible for providing the radio access interface for communications devices connected to the network. Each distributed unit 211, 212 has a coverage area (radio access footprint) 241, 242 where the sum of the coverage areas of the distributed units under the control of a controlling node together define the coverage of the respective communications cells 201, 202. Each distributed unit 211, 212 includes transceiver circuitry for transmission and reception of wireless signals and processor circuitry configured to control the respective distributed units 211, 212.

In terms of broad top-level functionality, the core network component 210 of the new RAT communications network represented in FIG. 2 may be broadly considered to correspond with the core network 102 represented in FIG. 1, and the respective controlling nodes 221, 222 and their associated distributed units/TRPs 211, 212 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device or UE 260 is represented in FIG. 2 within the coverage area of the first communications cell 201. This communications device 260 may thus exchange signalling with the first controlling node 221 in the first communications cell via one of the distributed units 211 associated with the first communications cell 201. In some cases communications for a given communications device are routed through only one of the distributed units, but it will be appreciated in some other implementations communications associated with a given communications device may be routed through more than one distributed unit, for example in a soft handover scenario and other scenarios.

In the example of FIG. 2, two communications cells 201, 202 and one communications device 260 are shown for simplicity, but it will of course be appreciated that in practice the system may comprise a larger number of communications cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated the specific wireless communications architecture in any given implementation is not of primary significance to the principles described herein. In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 221, 222 and/or a TRP 211, 212 of the kind shown in FIG. 2 which is adapted to provide functionality in accordance with the principles described herein.

Figure 3:
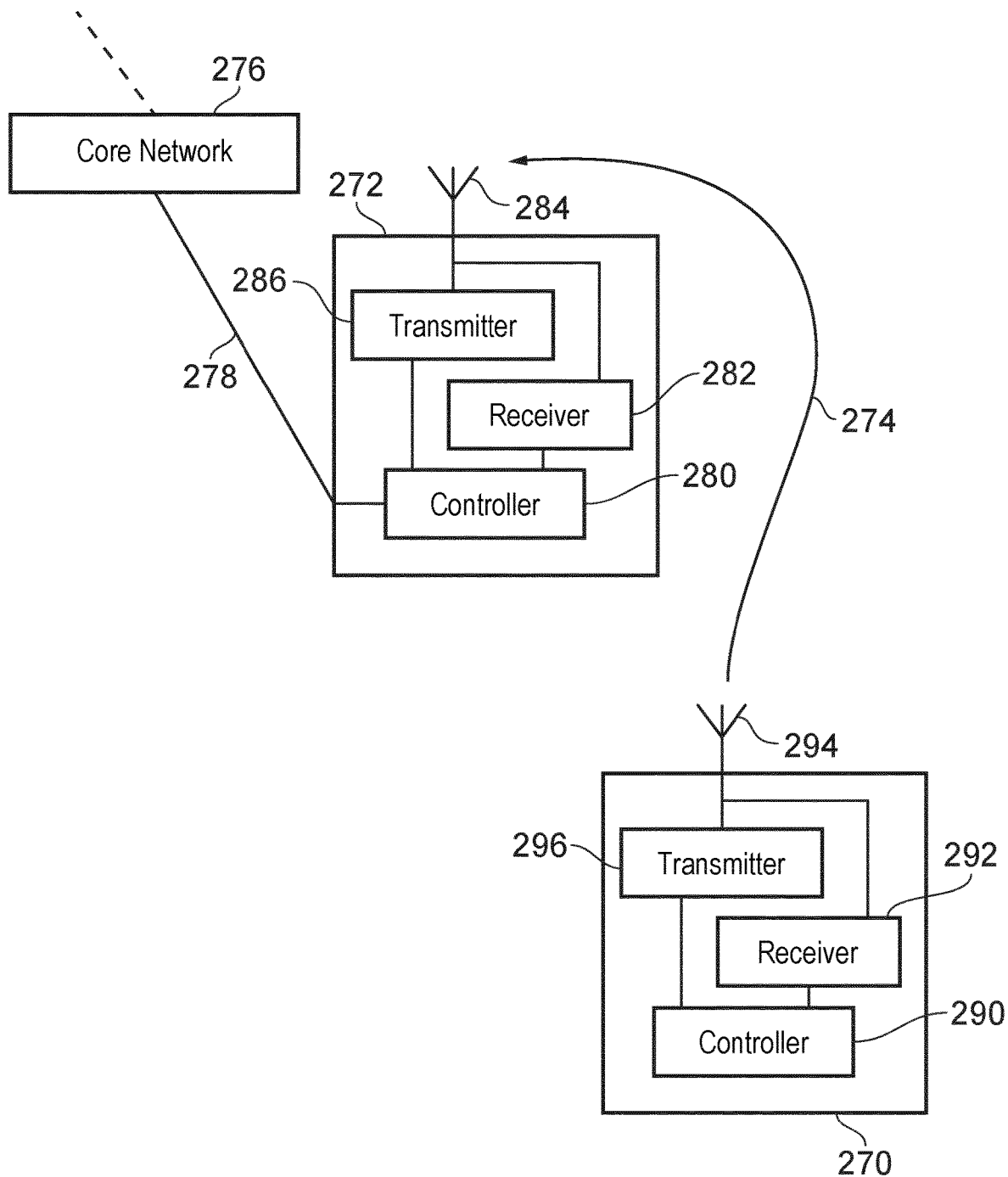
FIG. 3 is a schematic block diagram of an example infrastructure equipment and communications device configured in accordance with example embodiments.

A more detailed illustration of a communications device 270 and an example network infrastructure equipment 272, which may be thought of as a gNB 101 or a combination of a controlling node 221 and TRP 211, is presented in FIG. 3. As shown in FIG. 3, the communications device 270 is shown to transmit uplink data to the infrastructure equipment 272 via resources of a wireless access interface as illustrated generally by an arrow 274. The communications device 270 may also receive downlink data transmitted by the infrastructure equipment 272 (not shown). As with FIGS. 1 and 2, the infrastructure equipment 272 is connected to a core network 276 (which may correspond to the core network 102 of FIG. 1 or the core network 210 of FIG. 2) via an interface 278 to a controller 280 of the infrastructure equipment 272. The infrastructure equipment 272 may additionally be connected to other similar infrastructure equipment by means of an inter-radio access network node interface, not shown on FIG. 3.

The infrastructure equipment 272 includes a receiver 282 connected to an antenna 284 and a transmitter 286 connected to the antenna 284. Correspondingly, the communications device 270 includes a controller 290 connected to a receiver 292 which receives signals from an antenna 294 and a transmitter 296 also connected to the antenna 294.

The controller 280 is configured to control the infrastructure equipment 272 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 280 may comprise circuitry which is suitably configured/programmed to provide the desired functionality using conventional programming/configuration techniques for equipment in wireless telecommunications systems. The transmitter 286 and the receiver 282 may comprise signal processing and radio frequency filters, amplifiers and circuitry in accordance with conventional arrangements. The transmitter 286, the receiver 282 and the controller 280 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 272 will in general comprise various other elements associated with its operating functionality.

Correspondingly, the controller 290 of the communications device 270 is configured to control the transmitter 296 and the receiver 292 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 290 may comprise circuitry which is suitably configured/programmed to provide the desired functionality using conventional programming/configuration techniques for equipment in wireless telecommunications systems. Likewise, the transmitter 296 and the receiver 292 may comprise signal processing and radio frequency filters, amplifiers and circuitry in accordance with conventional arrangements. The transmitter 296, receiver 292 and controller 290 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the communications device 270 will in general comprise various other elements associated with its operating functionality, for example a power source, user interface, and so forth, but these are not shown in FIG. 3 in the interests of simplicity.

The controllers 280, 290 may be configured to carry out instructions which are stored on a computer readable medium, such as a non-volatile memory. The processing steps described herein may be carried out by, for example, a microprocessor in conjunction with a random access memory, operating according to instructions stored on a computer readable medium.

Figure 4:
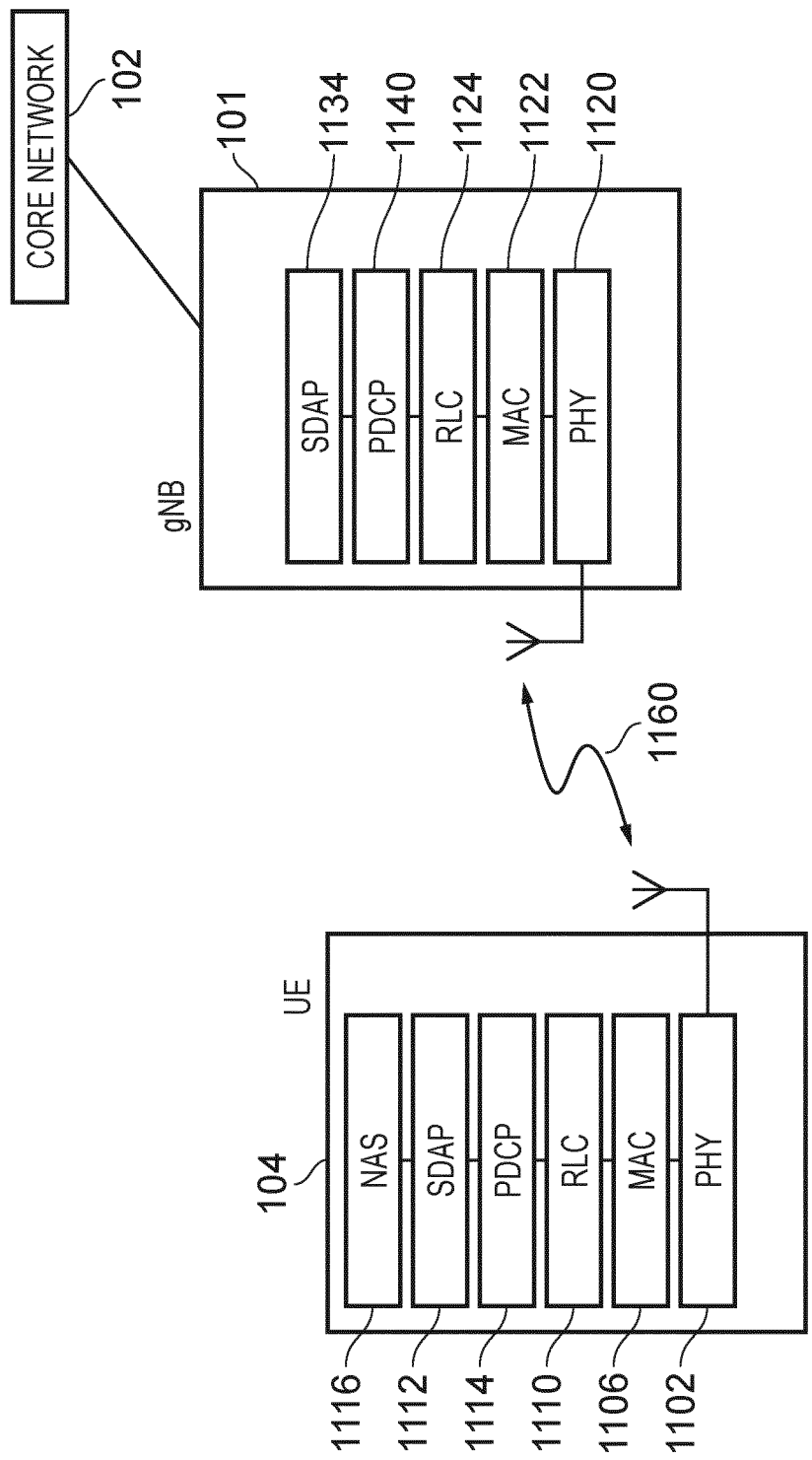
FIG. 4 is a block diagram showing logical protocol entities within a communications device and infrastructure equipment 101 which may be configured to operate in accordance with example embodiments of the present technique.

FIG. 4 is a block diagram showing logical protocol entities within a communications device 104 and the infrastructure equipment 101 which may be configured to operate in accordance with example embodiments of the present technique. The communications device 104 may broadly correspond to the communications device 270 illustrated in FIG. 3 and described above. The infrastructure equipment 101 may broadly correspond to the infrastructure equipment 272 illustrated in FIG. 3 and described above.

Protocol entities may be characterised by functions which they provide to other protocol entities. For example, a physical layer (PHY) protocol entity 1102 may control the transmitter 296 and receiver 292 to transmit and receive signals representing data on the wireless access interface. The PHY protocol entity 1102 may thus provide an encoding and modulation function for data transmission, and a demodulation and decoding function for data reception.

The PHY protocol entity 1102 may provide these services to a medium access control (MAC) protocol entity 1106 which in turn provides services to a radio link control (RLC) protocol entity 1110. The RLC entity 1110 interacts with a packet data convergence protocol (PDCP) entity 1114, which in turn receives data for transmission from, and passes received data to, a non-access stratum (NAS) layer 1116. The NAS layer may be an example of an 'upper layer', with respect to the access stratum (AS) layer comprising the PDCP protocol entity 1114 and lower layer protocol entities. In addition, an SDAP (Service Data Adaptation Protocol) protocol entity 1112, may reside on top of (i.e. at a higher logical layer than) the PDCP protocol entity 1114.

Data may be communicated between the communications device 104 and the infrastructure equipment 101a via a first wireless access interface 1160.

The infrastructure equipment 101 has an RLC entity 1124 which has as a peer the RLC entity 1110 of the communications device 104 for each radio bearer. The infrastructure equipment 101 has a MAC protocol entity 1122 being the peer of the corresponding MAC entity 1106 of the communications device 104, and a PHY entity 1120 being a peer of the corresponding PHY entity 1102 of the communications device 104.

At the PDCP protocol layer, the PDCP entity 1114 of the communications device 104 has as its peer a PDCP entity 1140 of the infrastructure equipment 101. Similarly an SDAP entity 1134 of the infrastructure equipment 101 is the peer of the communications device's SDAP entity 1116.

Each protocol entity in the communications device 104 may be implemented by the controller 290 in combination with the receiver 292 and transmitter 270 of the communications device.

Similarly, each protocol entity in the infrastructure equipment 101 may be implemented by the controller 280 in combination with the receiver 282 and transmitter 286 of the infrastructure equipment.

Header/PDU Formats

Conventionally, each protocol layer operates substantially independently. That is, a protocol entity receives data from, or passes data to, other protocol entities which are logically vertically adjacent, and carries out functions defined for that protocol layer. Here, in the context of a particular protocol layer, 'user data' refers to any data generated by (and for reception by) a higher protocol layer and may include data generated at an application.

Protocol entities may cooperate with peer entities in other devices by means of signalling. The signalling may be by means of data units generated within the protocol entities which are forwarded for transmission to the cooperating peer entity, or by appending or prepending control information to user data which is being processed for transmission.

Accordingly, conventionally protocol entities may add a header to each data unit which is passed to a lower layer entity, the header comprising control information for the operation of the pair of cooperating protocol entities. At the receiving entity, the receiving cooperating protocol entity processes the control information, and removes it before passing any user data up to a higher layer.

Example of such signalling are sequence numbers (which are generally included within headers) and acknowledgement information (which may be included within a header, or transmitted separately from other data). Where a protocol entity may process data associated with multiple logical connections, a header may also comprise an identity of the logical connection associated with the user data.

User data received as a single unit (service data unit, SDU) from a higher protocol layer may be used to form a corresponding single unit (protocol data unit, PDU) to be passed to a lower protocol layer (or transmitted on the wireless access interface). Alternatively, there may be a one-to-many mapping between SDU and PDUs ("segmentation") and/or a combining of SDUs (or portions thereof) into a single PDU. A function of the receiving protocol layer may be to reassemble the original SDUs based on one or more received PDUs. Signalling may be provided in headers to enable this function.

In FIG. 4, there is shown only one instance of each protocol entity, however the present disclosure is not so limited. In particular, there may be different numbers of entities at each layer. For example, a single RLC protocol entity may receive user data from multiple higher layer PDCP entities, and a corresponding receiving RLC protocol entity may be responsible for forwarding received user data to the appropriate receiving PDCP entity. This function may be based on control information in a header.

Although conventionally a header may refer to control information which is positioned at the start of a PDU (typically before user data), the present disclosure is not so limited, and the term header or header information may include control information (i.e. not user data), irrespective of its location within a PDU.

The addition of control information at each protocol layer can result in a significant amount of overhead being transmitted together with application layer data.

Embodiments of the present technique can provide a method of transmitting data by a transmitting entity in a wireless communications network to a receiving entity. The transmitting entity may be a communications device (user equipment) or an infrastructure equipment of a wireless communications network and correspondingly the receiving entity may be the other of the communications device and the infrastructure equipment so that the technique can be used on both the uplink or the downlink. Alternatively, both the transmitting entity and the receiving entity may be a communications device (user equipment), for example within a device-to-device or peer-to-peer network. The method comprising receiving, at the transmitting entity, data for transmission via a wireless access interface of the wireless communications network, dividing the data into portions for transmission, forming from each portion of data for each of one or more protocol layers one or more protocol data units, the one or more protocol data unit being formed for each layer according to a protocol applied by the layer for transmitting the protocol data unit and each of the protocol data units for each layer includes a header, and transmitting the data via the wireless access interface by processing each of the one or more protocol data units via each of the one or more protocol layers. The forming from each portion of the data for each of the one or more protocol layers the one or more protocol data units comprises determining a value of one or more input parameter, determining a header format for each of the one or more protocol layers based on the value of each of the one or more input parameters, forming the one or more protocol data units for each of the one or more protocol layers in accordance with each of the determined header formats, and transmitting the one or more protocol data units for each of the one or more protocols to the receiving entity. According to example embodiments the determining the value of the one or more input parameters and determining the header format for the one or more protocol data units of each of the one or more protocol layers is done dynamically for each of the portions of data to be transmitted.

Embodiments of the present technique can provide a dynamic adaptation of a format of the headers of protocol data units formed for transmitting data via one or more protocol layers using a machine learning technique to select the header format based on currently experienced values of one or more input parameters. Thus based on the value of each of the one or more input parameters a machine learning or artificial intelligence circuit applies a trained configuration to select the header format dynamically in accordance with for example currently experienced radio conditions. Accordingly redundancy included in a protocol data unit can be reduced to a minimum using a machine learning technique.

Accordingly, the amount of control information associated with one or more protocol layers can be dynamically adapted, to more efficiently make use of the available capacity of a wireless communications link.

In some embodiments, a format indicator is transmitted together with the data and control information, for allowing the receiver to determine the format used for the header associated with one or more protocol layers. This can reduce an amount of blind decoding at a receiver, in which multiple attempts may be made to decode received signals in accordance with possible formats.

In some embodiments, a joint determination is made in respect of two or more vertically adjacent protocol layers, to determine a format for each of their headers.

Figure 5:
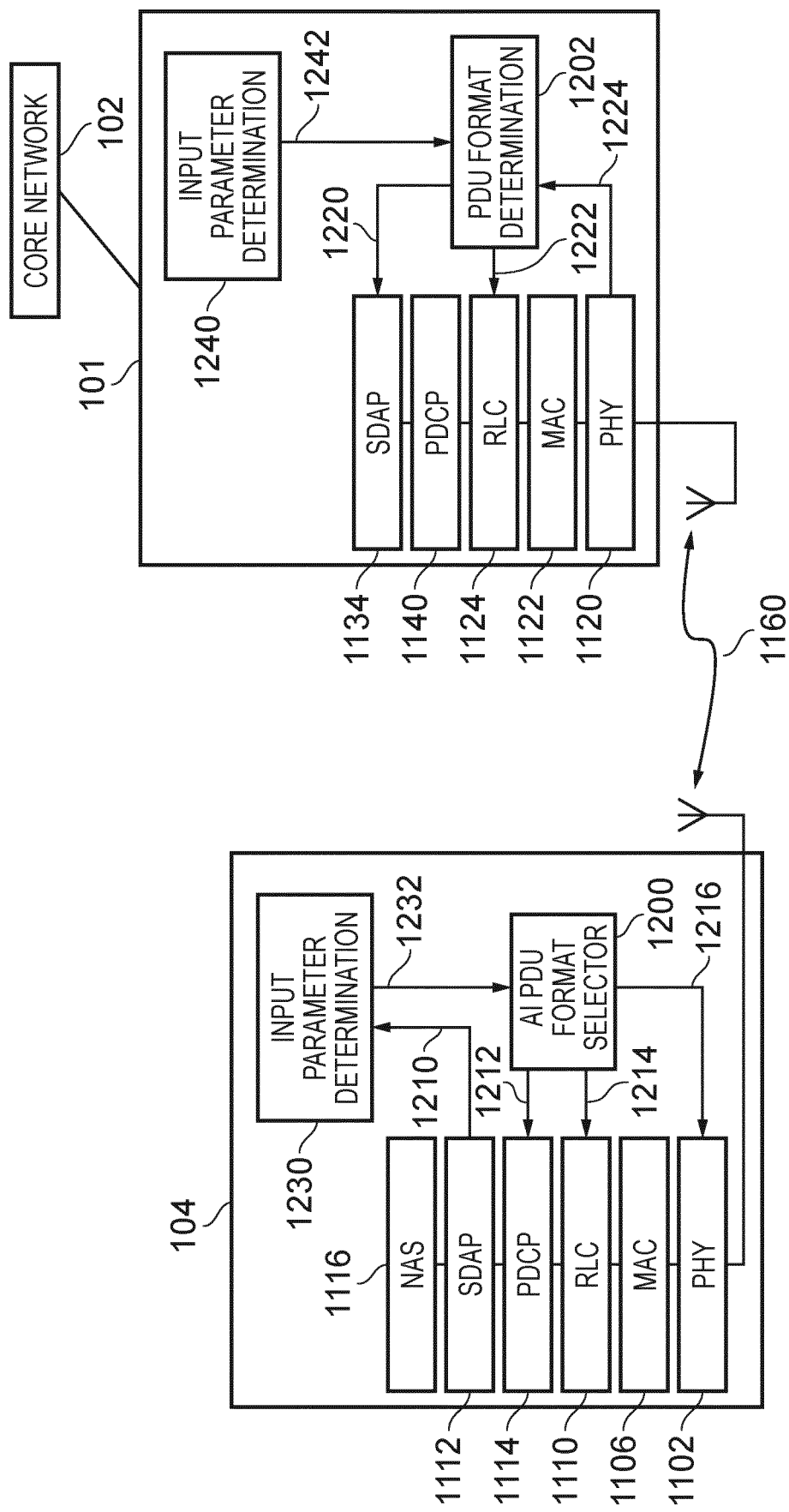
FIG. 5 illustrates a block diagram showing logical protocol entities within a communications device 104 and infrastructure equipment adapted in accordance with example embodiments of the present technique.

FIG. 5 illustrates a block diagram showing logical protocol entities within a communications device 104 and infrastructure equipment adapted in accordance with example embodiments of the present technique.

In the example of FIG. 5, data is transmitted from the communications device 104 to the infrastructure equipment 101. However, it will be appreciated that corresponding modifications may be made in respect of the transmission of data in the opposite direction, i.e. from the infrastructure equipment 101 to the communications device 104.

Similarly, the present disclosure is not limited to transmissions in a conventional hierarchical cellular network, but also finds applicability in transmissions between peer entities, such as in device-to-device or peer-to-peer communications, such as between two instances of the communications device 104.

In addition to the protocol entities described above in respect of FIG. 4, the communications device 104 (the data transmitter) comprises an artificial intelligence (AI) protocol data unit (PDU) format selector 1200. The communications device 104 also comprises an Input Parameter determination unit 1230.

Similarly, the infrastructure equipment 101 (here being the recipient of the data) comprises a PDU format determination unit 1202 and, in some embodiments, an Input Parameter determination unit 1240.

The AI PDU format selector 1200 and the Input Parameter determination unit 1230 in the communications device 104 may be implemented by the controller 290 of the communications device.

Similarly, the PDU format determination unit 1202 and the Input Parameter determination unit 1240 in the infrastructure equipment 101 may be implemented by the controller 280 of the infrastructure equipment.

The AI PDU format selector 1200 selects from one of a plurality of header formats for each of one or more protocol entities, the selected header format to be used for the transmission of particular user data.

The selection is based on the value of one or more input parameters determined by the input parameter determination unit 1230, as will further be described below.

The selected header format is indicated to the respective protocol entity, which then encodes user data for transmission in accordance with the selected header format.

In the example of FIG. 5, the AI PDU format selector 1200 selects a header format for use at the PDCP entity 1114 and the RLC entity 1110 of the communications device 101.

Figure 6:
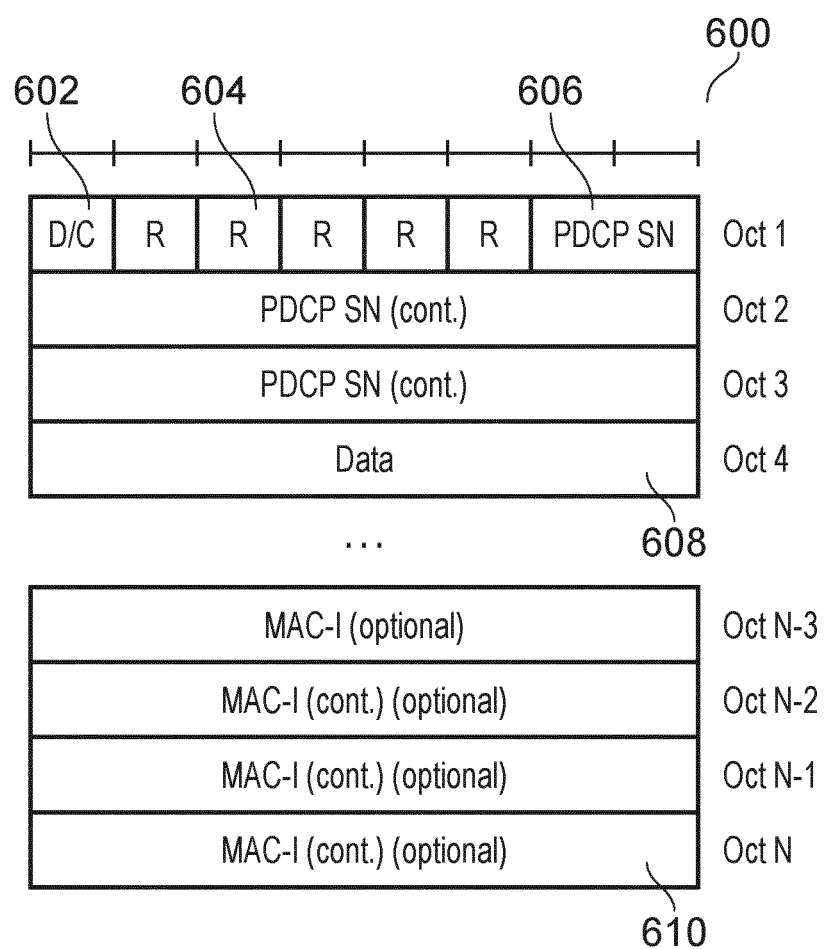
FIG. 6 illustrates a format of a conventional data unit.

As described above, headers may contain various control information for use by the peer protocol entity. FIG. 6 illustrates a format of a conventional 5G (NR) PDCP data PDU 600 for use with dedicated radio bearers (DRBs) in accordance with [3].

The PDU 600 comprises a data/control "D/C" bit 602 to indicate whether the PDCP PDU is a PDCP Data PDU (in which case the D/C bit 602 is set to 1) or a PDCP Control PDU (in which case the D/C bit 602 is set to 0) or vice versa. The PDU 600 also comprises a number of reserved "R" bits 604 for future use. A PDCP sequence number "SN" field 606 occupies a further 18 bits and indicates a sequence number of the PDU, relative to other PDUs generated by the PDCP entity. Conventionally, the sequence number length may be set to either 12 or 18 bits, and is semi-statically configured.

Following the SN field 606 is a data field 608 for the inclusion of user data, such as from the NAS protocol entity 1116.

Optionally, the conventional PDCP PDU 600 may include a Message Authentication Code for Integrity ("MAC-I") field 610 permitting a receiving PDCP entity to verify the integrity of the data 608.

Conventional RLC PDU formats can be found in [5] and conventional SDAP PDU formats can be found in [4].

In accordance with embodiments of the present technique, an output of the AI PDU format selector 1200 may be an indication (such as a PDCP header format indication 1212 or an RLC header format indication 1214) to a protocol entity for controlling the header format used by that protocol entity in respect of formatting a PDU for transmission. For example, the indication may indicate a number of bits to be used for a sequence number field. In some embodiments, the indicated number of bits to be used for a sequence number field may be zero, i.e. the PDU is not to contain any sequence number indication.

In some embodiments, the indication may indicate whether one or more conventional header fields are to be included in the header. For example, the indication may indicate whether a conventional RLC segment offset (SO) field is to be included, and if so, the length of the field.

Accordingly, for example, the AI PDU format selector 1200 may control the length or presence of one or more fields within one or more PDU headers. These fields may include (in addition to, or instead of those described above), a logical channel identifier (LCID) field in a MAC header, a quality of service (QoS) flow identity (QFI) in a SDAP header In some embodiments, the selection of a header format may be from a plurality of pre-determined header formats. In some embodiments, the pre-determined header formats may be specified jointly in respect of multiple protocol headers. For example, each pre-determined header format may specify a particular PDCP header format and a particular RLC header format.

In some embodiments, the selected header may be selected from a plurality of header formats which are permitted according to conventional techniques. However, unlike conventional header format selection (which is semi-static, for example configured based on RRC configuration or the like), the header format selection may be dynamic, and changed from one PDU to the next, based on the inputs changing.

The selection of the header format(s) is preferably based on dynamic inputs, that is, inputs whose value which may vary from one PDU to another.

The values of the input parameters are determined by the input parameter determination unit 1230, which may operate in cooperation with one or more other functional or logical units to determine the value of the input parameters. The values of the input parameters may be passed in an input parameter value indication 1232 from the input parameter determination unit 1230 to the AI PDU format selector 1200.

For example, in some embodiments, an amount of data to be formed into a PDU is used as an input parameter. At the transmitting device (communications device 104 in FIG. 5), the SDAP entity 112 may, in response to forming an SDAP PDU for passing to the PDCP entity 1114, send a PDU size indication 1210 to the input parameter determination unit 1230.

The input parameter value indication 1232 may thus comprise an indication of a quantity of data (e.g. number of bytes) in the SDAP PDU.

Thus, the AI PDU format selector 1200 may select header format(s) for the PDCP PDU and (subsequently) RLC PDU formed from the SDAP PDU, based on the size of the SDAP PDU.

Additionally, or alternatively, the input parameter value indication 1232 may comprise one or more of
- an indication of service requirements associated with the data;
- an indication of radio conditions applicable to transmissions by the transmitter (communications device 104) on the wireless access interface 1160;
- an indication of a mobility status of the transmitter (communications device 104) with respect to the receiver (infrastructure equipment 101);
- parameters associated with allocated communications resources to be used for the transmission of the data, such as parameters from which a transport block size may be determined; and
- an indication of a location of the transmitter.

For example, the indication of the service requirements associated with the data may comprise an indication of reliability requirements (e.g. probability of successful transmission), latency requirements (e.g. maximum permitted delay within the access stratum protocol layers) and/or other quality of service requirements associated with the data.

The indication of radio conditions may comprise an indication of results of measurements of signals received on the wireless access interface by either the transmitter or the receiver, and may for example comprise one or more of received signal power measurements, received signal quality measurements, error rates after decoding (e.g. block error rates), and the like.

The indication of the mobility status may indicate whether or not the communications device 104 is moving at a high speed (e.g. at or above a vehicular speed) with respect to the infrastructure equipment, whether or not the communications device 104 is likely to change cell within a certain time period, and/or whether or not the communications device 104 is moving at all (e.g. is not fixed in a particular location).

The indication of the location of the transmitter may be absolute (e.g. based on satellite-based location determination) or relative (e.g. at an edge of a current serving cell or close to a centre of the serving cell).

The value of one or more of the input parameters may be determined by the input parameter determination unit 1230 by receiving an indication of the value of one or more input parameter from the receiving entity. For example, an indication of the radio conditions applicable to transmissions by the transmitter (communications device 104) on the wireless access interface 1160 may comprise a measurement report sent by the receiver (infrastructure equipment 101) in which a result of a measurement of signals transmitted by the transmitter (communications device 104) on the wireless access interface 1160 and received at the receiver (infrastructure equipment 101). Accordingly, the input parameter determination unit 1230 may receive (for example, from a radio resource control entity of the communications device 104, not shown in FIG. 5) the indication of the radio conditions.

The value of one or more of the input parameters may be determined by receiving an indication of the value of the input parameter from another entity, such as from the core network 102. For example, an indication of service requirements associated with the data may be received as part of NAS signalling. Accordingly, the input parameter determination unit 1230 may receive (for example, from a NAS entity of the communications device 104) the indication of the service requirements.

Based on the value(s) of the input parameter(s) indicated by the input parameter value indication 1232, the AI PDU format selector 1200 determines PDU formats for use by the respective one or more protocol entities. For example, the PDU format may define a header format for the respective one or more protocol entities. This determination may be made jointly in respect of two or more protocol entities.

The AI PDU format selector 1200 may operate in accordance with artificial intelligence/machine learning techniques. That is, for example, the AI PDU format selector 1200 may operate based on a model derived in accordance with machine learning techniques as will be described below.

The model selects, for any permitted combination of input values, a header for each of the applicable protocol entities. In some embodiments, the header may be selected from a pre-determined plurality of header formats, in which case the model may apply a classification process, to classify the input values as corresponding to exactly one of the predetermined header formats or, where the determination is done jointly for two or more protocol layers, to exactly one of a plurality of predetermined sets of header formats.

In some embodiments of the present technique, the communications device 104 may receive a representation of the model, which is stored in memory (not shown) of the communications device 104. Preferably, the memory is non-volatile memory. In some embodiments, the model is provisioned within the communications device 104 prior to sale to an end user and before operation. In some embodiments, the model of the communications device 104 is updated, for example by means of an over-the-air (OTA) update.

Where the selection of the header format is from a plurality of pre-determined header formats, as described above, then in some embodiments, the AI PDU format selector 1200 may generate a header format index indication 1216, which indicates which of the plurality of pre-determined header formats has been selected.

In the example of FIG. 5, the header format index indication 1216 is forwarded to the PHY protocol entity 1102, and the PHY protocol entity 1102 encodes the header format index indication 1216 in the signals transmitted on the wireless access interface 1160.

In embodiments where the header format is selected from predetermined formats which are specified for conventional, but semi-static configuration, it may be possible to indicate the selected header format using conventional fields for that purpose. Alternatively, one or more bits in a header which are conventionally reserved (i.e. have no specified semantics associated with the) may be used to indicate the selected header format. For example, one of the reserved bits 604 of the PDCP header may be used to indicate whether a number of bits used for the PDCP sequence number is a first predetermined value, or a second predetermined value.

In some embodiments, the receiver entity may receive the transmitted data together with the encoded header format index indication 1216. The receiver may (for example, at the PHY protocol entity 1120) decode the header format index indication 1224 and forward it to a PDU format determination unit 1202. Based on the header format index indication 1224, the PDU format determination unit 1202 determines the header formats selected for the transmission of the data by the AI PDU format selector 1200 of the transmitter. Accordingly, the PDU format determination unit 1202 generates receiver header format indications, such as an RLC receiver header format indication 1222 and a PDCP receiver header format indication 1220 to the respective protocol entities (such as the RLC protocol entity 1124 and the PDCP entity 1140, respectively) at the receiver.

Based on the receiver header format indications, the protocol entities process the received data, removing the header portions, and pass the user data to the higher protocol layer entities.

Thus in some embodiments, the PDU format determination unit 1202 generates the receiver header format indications based on the decoded header format index indication 1224.

In some embodiments, the PDU format determination unit 1202 generates the receiver header format indications based on a receiver input parameter value indication 1242 received from the input parameter determination unit 1240. The receiver input parameter value indication 1242 may comprise an indication of the values of input parameters which match those used by the AI PDU format selector 1200. In some embodiments, the input parameter determination unit 1240 may determine one or more parameters based on a previous allocation of resources used for the transmission of the data. For example, the allocation may be associated with a modulation and/or coding scheme, and may comprise a set of uplink communications resources. Based on the quantity of resources and/or the modulation and/or coding scheme, the input parameter determination unit 1240 may determine a transport block size to be used by the transmitting entity.

The input parameter determination unit 1240 may receive an indication of one or more input parameter values from the communications device 104 by the infrastructure equipment 101, and/or from another entity such as the core network 102.

That is, in some embodiments, the PDU format determination unit 1202 may perform substantially the same determination as the AI PDU format selector 1200 to determine the one or more header formats.

Training the ML Model

In some embodiments, the AI PDU format selector 1200 (and the PDU format determination unit 1202 where it performs substantially the same determination) comprises a model based on machine learning. The machine learning may be performed separately, for example offline.

A representation of the resulting model may be stored in non-volatile memory on the communications device 104 and/or infrastructure equipment 101. In some embodiments, a representation of the model is transmitted to the transmitting entity (and, in some embodiments, the receiving entity).

The training of the machine learning model may in some embodiments aim to minimize a loss function calculated based on input parameter values and selected header formats. That is, the model may iterate over a number of different values for the input parameters, and for each set of input parameter values, evaluate the loss function for different header formats.

In some embodiments, the loss function may be a transmission overhead associated with reliably transmitting data. For example, the loss function may be defined as $E=f[N_{TX}, N_{RX}]$, where $N_{TX}$ represents a total quantity of transmitted bits (including encoding bits, header bits, data bits and including any necessary retransmissions), $N_{RX}$ represents the number of data bits (excluding duplicates, overhead etc.) reliably transmitted, and $f[\ldots]$ represents a loss function definition. For example, $N_{RX}$ may represent the number of data bits as received from the NAS layer which were successfully transmitted. In some embodiments, the function f[ . . . ] corresponds to a mean squared error function E[ . . . ], such that $E[N_{TX}, N_{RX}]$ is defined as the average of a squared difference between $N_{TX}$, and $N_{RX}$.

The loss function may be any other suitable function, such as one which is increasing (or non-decreasing) with increased overhead.

In some embodiments, the model comprises a plurality of weights associated with units and may be trained in accordance with the principles of the known back propagation method. For example, initially the output (loss function) is determined based on a set of input values (forward propagation) based on a test data set. Then a partial derivative (gradient) of the loss function with respect to a weight W from an output layer unit to input layer unit (back propagation) is calculated. Finally, the model updates the weight W according to the gradient of backpropagation.

In some embodiments, the training generates a model for estimating overhead for any input combination of header formats and input parameter values. For example, where $H_{PDCP}$ represents an index to a particular PDCP header format, and $H_{RLC}$ represents an index to a particular RLC header format, and $I_1, \ldots I_N$ represent input parameter values, the model may determine a function f to estimate the expected loss $E=f(H_{PDCP}, H_{RLC}, I_1, \ldots I_N)$. Accordingly, in operation, the AI PDU format selector 1200 may, given input parameter values, evaluate the expected loss E for a number of different header formats jointly, and select the combination giving the lowest loss.

In some embodiments, the model may provide a classification. For example, the model may perform a function whose output is a vector, each element of the vector representing a different header format (or combination of header formats), such that for a given combination of input values only one element of the vector, corresponding to the most efficient header format, is equal to one, with the other elements having a value of zero. Accordingly, the training may determine internal weights for nodes within a conventional classification neural network.

Figure 7:
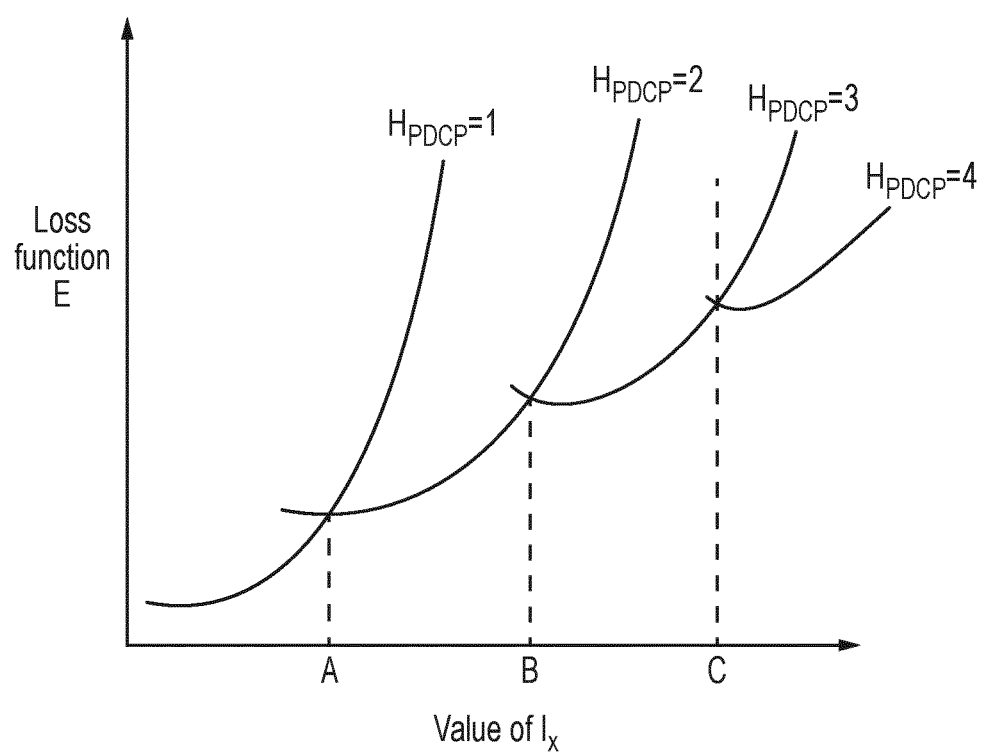
FIG. 7 is a graph showing a variation of a loss function against an input parameter value for different header formats, illustrating the principles underlying the training of the model in accordance with embodiments of the present technique.

FIG. 7 is a graph of a loss function against an input parameter value for different header formats, illustrating the principles underlying the training of the model.

In FIG. 7, the loss function E is plotted on the vertical axis, and the value of a parameter $I_x$ is plotted on the horizontal axis. It is assumed that all other input parameters are unchanged. Lines corresponding to different possible PDCP header formats (associated with different $H_{PDCP}$ indices) are shown. In general, it can be seen that for a given value of $I_x$, there is a corresponding header format which results in a minimal expected loss E. As part of the model training, such relationships between E, header format and parameter values may be determined to determine optimal header formats for given sets of input parameter values. In the example of FIG. 7, it can be seen that, for the particular input values shown, PLCP header having $H_{PDCP}=1$ is preferred for $I_x<A$, $H_{PDCP}=2$ is preferred for $A<I_x<B$, $H_{PDCP}=3$ is preferred for $B<I_x<C$, and $H_{PDCP}=4$ is preferred for $I_x>C$.

It will be appreciated that the resulting model may be represented within the model (and thus within the AI PDU format selector) in different ways: for example, a representation of the actual relationship between E and $I_x$, or a table of switching points, or a neural network classification scheme.

Figure 8:
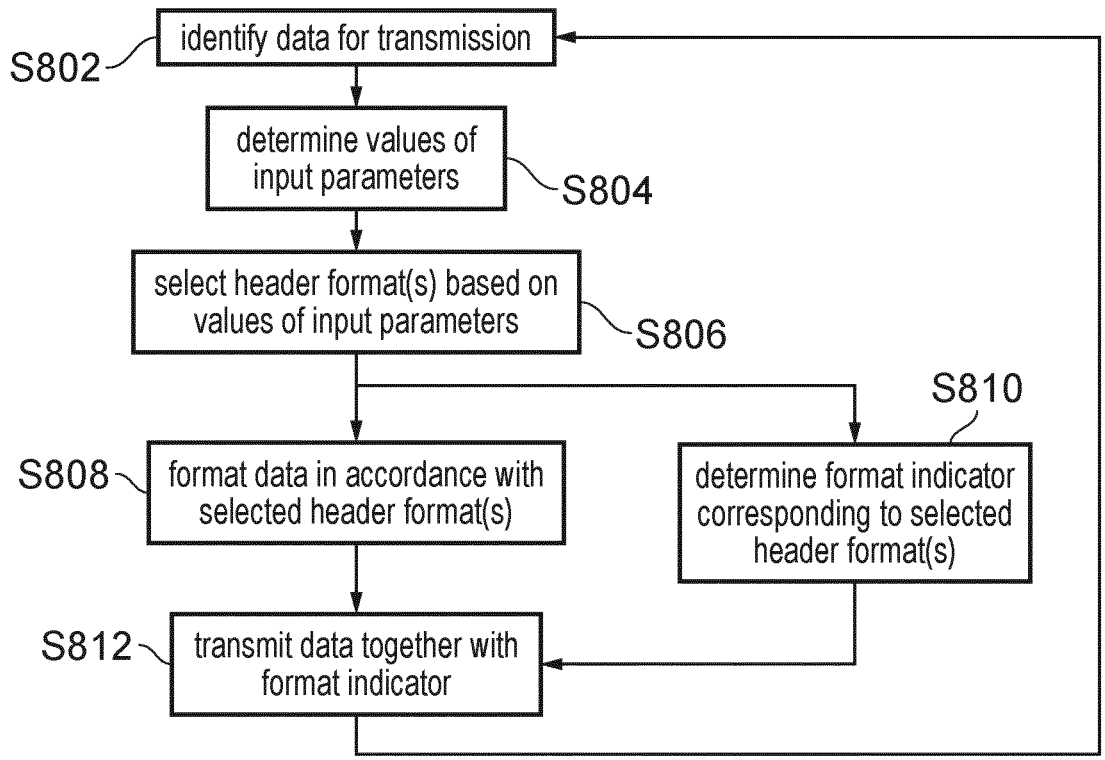
FIG. 8 illustrates a flow chart for a process carried out by a transmitting entity in accordance with embodiments of the present technique.

FIG. 8 illustrates a flow chart for a process carried out by a transmitting entity in accordance with embodiments of the present technique.

The process starts at step S802, in which data is identified for transmission. For example, the data may be received from a NAS protocol layer entity at an access stratum (AS) layer protocol entity. In some embodiments, the identified data has already been processed by one or more AS protocol entities. For example, in the example of FIG. 5, the data is identified after processing by the SDAP protocol entity 1112.

The process continues with step S804 in which values of the input parameters used for determining the header format(s) based on the model are determined. For example, the input parameters may comprise measurements of radio signals received by the transmitting entity, as described above. An input parameter may be the quantity of data identified at step S802.

At step S806, the input parameters are used, together with the model, for determining one or more header formats to be used in formatting the data for transmission by one or more corresponding protocol layer entities. For example, as shown in FIG. 5 and described above, the determining may be carried out by the AI PDU format selector 1200 to determine header formats to be used by the PDCP entity 1114 and RLC protocol entity 1110 in formatting the data. As described above, the model may have been determined based on machine learning.

In some embodiments, the data identified at step S802 may be formed into one PDCP PDU, and then into one RLC PDU. In some embodiments, the AI PDU format selector 1200 may determine based on the model one or more parameters for controlling a segmentation process in one or more protocol entities. Accordingly, based on the determined segmentation process parameters, one or more of the PDCP entity 1114 and the RLC protocol entity 1110 may at step S808 apply segmentation such that the data identified at step S802 is formatted within two or more PDUs.

After step S806, the one or more corresponding protocol layer entities format the data in accordance with the determined header format and/or other parameters determined at step S804.

At step S810, in some embodiments, a format indicator is determined based on the header format and/or other parameters determined at step S804 for informing the receiving entity how to process the received PDUs.

At step S812, the formatted data and (in some embodiments) the format indicator is transmitted to the receiving entity via a wireless access interface. Step S812 may comprise one or more encoding and modulation steps which may be carried out in a conventional approach, such as in accordance with specifications for the PHY protocol entity defined by the 3GPP NR (5G) specifications.

The process then repeats, continuing with step S802. Accordingly, a header format and/or other parameters for controlling the formatting of PDUs by one or more protocol entities may be dynamically determined for each portion of data to be transmitted.

Figure 9:
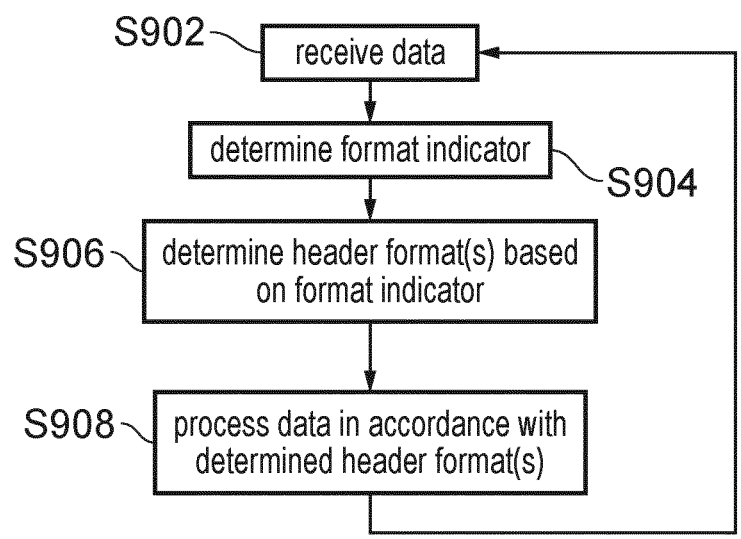
FIG. 9 illustrates a flow chart for a process carried out by a receiving entity in accordance with embodiments of the present technique.

FIG. 9 illustrates a flow chart for a process carried out by a receiving entity in accordance with embodiments of the present technique.

The process of FIG. 9 starts at step S902 in which data is received on the wireless access interface. The receiving step may comprise demodulation and decoding in accordance with conventional techniques, such as in accordance with specifications for the PHY protocol entity defined by the 3GPP NR (5G) specifications.

In some embodiments, the process continues with step S904, in which the format indicator is identified within (or accompanying) the received decoded data.

At step S906, header format(s) and other parameters for controlling the processing by the received data by one or more protocol entities are determined. In some embodiments, this may be based on the format indicator determined at step S904. In some embodiments, this may comprise a determination of one or more input parameter values and the use of the model corresponding to that used at step S806 by the transmitting entity.

At step S908, the data is processed in accordance with the determined header format(s) by the one or more protocol entities. The resulting data, once the headers have been removed and other conventional procedures carried out (which may include re-ordering, retransmissions, duplication detection and the like) is passed to successively higher protocol layers, and ultimately to the NAS layer.

Control then passes to step S902 and the process repeats in respect of subsequently received data. Accordingly, the receiving entity can process data in which the header (and PDU format in general) have been dynamically adapted at the transmitter, particularly where the dynamic adaptation is in accordance with a model determined based on machine learning.

Figure 10:
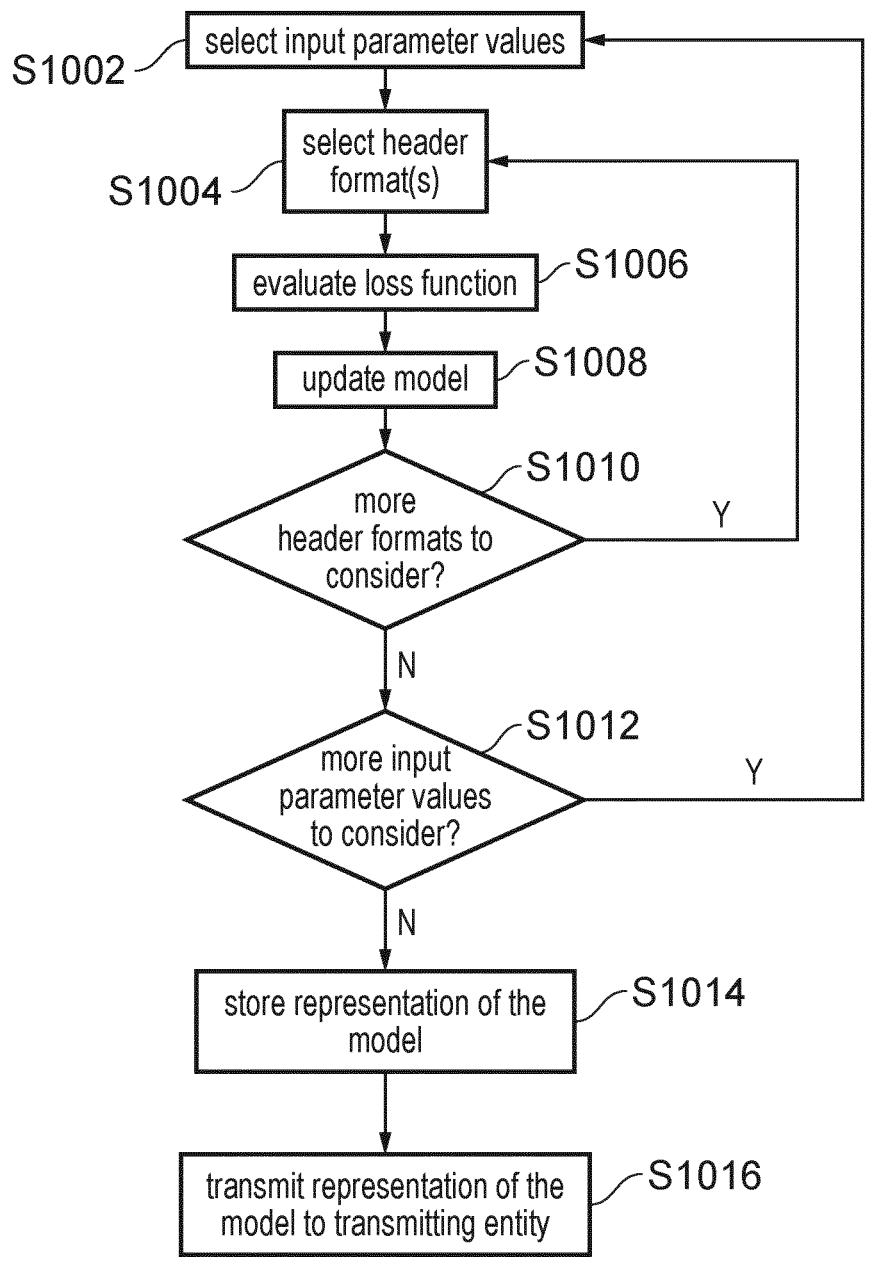
FIG. 10 illustrates a flow chart for a process carried out by a modelling entity in accordance with embodiments of the present technique.

FIG. 10 illustrates a flow chart for a process carried out by a modelling entity in accordance with embodiments of the present technique.

The process of FIG. 10 starts at step S1002 in which values for one or more input parameters are determined. These may be determined in a deterministic manner (e.g. by selecting a next in sequence value from a predetermined range of values for each respective input parameter) or may be randomly selected. The method of selection may be different for different parameters: for example, a location of the transmitting entity may be selected randomly, while a signal quality parameter may be increased in steps.

At step S1004, a header format (or more generally, a PDU format) for each of one or more protocol entities is selected. This may be selected at random, selected based on the current version of the model, or selected in a deterministic manner (e.g. sequentially selected from a set of predetermined formats).

At step S1006, a loss function corresponding to the format(s) selected at step S1004 and the input parameter values selected at step S1002 is determined. Preferably, the loss function is non-decreasing as the relative 'cost' of transmitting data increases. Cost may be represented by overhead data bits, transmission energy or consumed system capacity (e.g. time-bandwidth product). Any suitable loss function may be used.

The loss function may be determined by simulation, or by data acquired corresponding to actual data transmissions.

Based on the loss function determined at step S1006, the model is updated. The update may be automatic, in accordance with known machine learning techniques. For example, if the current (non-updated) model indicates that for the input parameter values selected at step S1002 a particular format should be selected, and it is determined that the loss function determined at step S1006 is lower for the header format(s) selected at step S1004 than for the formats currently suggested according to the model, then the model may be updated so that for the input parameter values selected at step S1002, the header format(s) selected at step S1004 is recommended by the updated model.

At step S1010, it is determined if more header formats are to be considered for the same input parameter values. If so, control returns to step S1004, otherwise control continues to step S1012.

At step S1012, it is determined if further input parameter values are to be considered. If so, then control returns to step S1002, otherwise control passes to step S1014.

In step S1014, a representation of the updated model is stored, for example on a computer-readable medium.

At step S1016, a representation of the model is transmitted to the transmitting entity. The transmission in step S1016 may be via a wireless access interface (such as via the wireless communications network shown in FIG. 5) or may be via a wired interface (such as during a manufacturing process).

The representation of the model transmitted at step S1016 may be a reduced representation of the model stored at step S1014. For example, the model stored at step S1016 may comprise an indication of the value of the loss function determined at step S1006, while the reduced model representation transmitted at step S1016 may provide only a means to determine header format(s) based on input parameter values.

In some embodiments, one or more of the steps of the processes illustrated in FIG. 8, FIG. 9 and FIG. 10 may be modified, omitted or performed in a different order. For example, in FIG. 10, steps S1002 and S1004 may be performed in a different order. Above have been given descriptions of example processes combining sequences of steps and messages in combination. The scope of the present disclosure is not, however, limited to such specific combinations and in some embodiments, various of the steps and messages described may be omitted, or combined in a different order, or modified.

As described above, the AI PDU format selector 1200 and the PDU format determination unit 1202 control the format of one or more headers, associated with respective protocol layer entities. In some embodiments, the AI PDU format selector 1200 and the PDU format determination unit 1202 additionally control the operation (i.e. procedures) associated with the respective protocol layer entities, in accordance with the selected header format. For example, in an embodiment in which a sequence number of a header field is omitted, the AI PDU format selector 1200 and the PDU format determination unit 1202 may control the corresponding protocol entity to refrain from the use of any conventional acknowledgement procedure, and (after removing or adding the relevant header information) to pass the data contained within the PDU to the next layer for processing.

In some embodiments, the operation of the AI PDU format selector 1200 and the PDU format determination unit 1202 is carried out on a packet-by-packet basis, without state being maintained between packets. In some other embodiments, the PDU format selector may operate based on an aspect of a previous transmission. For example, after a first transmission of a packet, the network may learn that the radio conditions for subsequent transmissions of packets will remain unchanged and accordingly applies the same policy for these subsequent packets. For example, if a PDCP SDU was segmented into four RLC PDUs and if treatment of all four packets remains the same in the scheduler e.g. radio conditions remain unchanged and scheduling policy remains the same (e.g. load) then the RLC SN can be omitted from the RLC headers.

Thus there has been described a method of transmitting data in a wireless communications system, the method comprising identifying within the data a data frame having a protocol header, the protocol header comprising a plurality of protocol header fields and associated with a medium access control (MAC) frame format for data transmission within a local area network (LAN), determining a selected profile for header compression, the profile being selected from a plurality of predetermined profiles, each of the plurality of predetermined profiles specifying a subset of the protocol header fields, and applying compression to a subset of the protocol header fields in accordance with the selected profile to form a compressed data frame for transmission on a wireless access interface of the wireless communications system.

There has further been described a method of transmitting data by a transmitting entity in a wireless communications network to a receiving entity. The method comprises receiving, at the transmitting entity, data for transmission via a wireless access interface of the wireless communications network, dividing the data into portions for transmission, forming from each portion of data for each of one or more protocol layers one or more protocol data units, the one or more protocol data units being formed for each layer according to a protocol applied by the layer for transmitting the protocol data unit and each of the protocol data units for each layer includes a header, and transmitting the data via the wireless access interface by processing each of the one or more protocol data units via each of the one or more protocol layers, wherein the forming from each portion of the data for each of the one or more protocol layers the one or more protocol data units comprises determining a value of one or more input parameters, determining a header format for each of the one or more protocol layers based on the value of each of the one or more input parameters, forming the one or more protocol data units for each of the one or more protocol layers in accordance with each of the determined header formats, and transmitting the one or more protocol data units for each of the one or more protocols to the receiving entity, the determining the value of the one or more input parameters and the determining the header format for the one or more protocol data units of each of the one or more protocol layers being performed dynamically for each of the portions of data to be transmitted.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the communications device. It will be appreciated such predetermined/predefined information may in general be established, for example, by definition in an operating standard for the wireless telecommunication system, or in previously exchanged signalling between the base station and communications devices, for example in system information signalling, or in association with radio resource control setup signalling, or in information stored in a SIM application. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

It will be appreciated that the principles described herein are not applicable only to certain types of communications device, but can be applied more generally in respect of any types of communications device, for example the approaches are not limited to machine type communication devices/IoT devices or other narrowband communications devices, but can be applied more generally, for example in respect of any type communications device operating with a wireless link to the communications network.

It will further be appreciated that the principles described herein are not applicable only to LTE-based wireless telecommunications systems, but are applicable for any type of wireless telecommunications system that supports the transmission of messages which are formatted in accordance with protocol data unit formats associated with a particular logical protocol entity.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of transmitting data by a transmitting entity in a wireless communications network to a receiving entity, the method comprising
   receiving, at the transmitting entity, data for transmission via a wireless access interface of the wireless communications network,
   dividing the data into portions for transmission,
   forming from each portion of data for each of one or more protocol layers one or more protocol data units, the one or more protocol data units being formed for each layer according to a protocol applied by the layer for transmitting the protocol data unit and each of the protocol data units for each layer includes a header, and
   transmitting the data via the wireless access interface by processing each of the one or more protocol data units via each of the one or more protocol layers, wherein the forming from each portion of the data for each of the one or more protocol layers the one or more protocol data units comprises
   determining a value of one or more input parameters,
   determining a header format for each of the one or more protocol layers based on the value of each of the one or more input parameters, forming the one or more protocol data units for each of the one or more protocol layers in accordance with each of the determined header formats, and transmitting the one or more protocol data units for each of the one or more protocols to the receiving entity, the determining the value of the one or more input parameters and the determining the header format for the one or more protocol data units of each of the one or more protocol layers being performed dynamically for each of the portions of data to be transmitted.

Paragraph 2. A method according to paragraph 1, wherein the determining the header format for the one or more protocol data units for each of the one or more protocol layers comprises using a model trained using machine learning.

Paragraph 3. A method according to paragraph 1 or paragraph 2, wherein the input parameters comprise one or more of a radio condition associated with a wireless link between the transmitting entity and the receiving entity, a service requirement associated with the portion of the data, a quantity of data in the portion of the data, a mobility status of the transmitting entity relative to the receiving entity, and a position of the transmitting entity.

Paragraph 4. A method according to any of paragraphs 1 to 3, wherein determining the header format for a protocol layer comprises determining a number of bits to be used in the header to represent one or more of a sequence number, a logical channel identifier, a segment offset, and a quality of service (QoS) flow identifier.

Paragraph 5. A method according to any of paragraphs 1 to 4, wherein the determining the header format for each of the one or more protocol layers based on the value of each of the one or more input parameters, comprises determining a value of a format indicator to indicate the determined header format for each of the one or more protocol layers, and transmitting an indication of the format indicator with the one or more protocol data units for each protocol layer.

Paragraph 6. A method according to any of paragraphs 1 to 5, wherein each header format is selected from a plurality of predetermined header formats for the protocol layer.

Paragraph 7. A method according to any of paragraphs 1 to 6, wherein the one or more protocol layers comprise at least two protocol layers and the determining the header format for each of the one or more protocol layers comprises selecting the header formats for each of protocol layers jointly.

Paragraph 8. A method according to any of paragraphs 1 to 7, wherein the one or more protocol layers comprise one or more of a service data adaptation protocol layer, a packet data convergence protocol layer, a radio link control layer, and a medium access control layer.

Paragraph 9. A method according to any of paragraphs 1 to 8, wherein the determining the one or more input parameters includes receiving an indication of an input parameter from the receiving entity.

Paragraph 10. A method of any of paragraphs 1 to 9, wherein the determining the header format for of the one or more protocol data units for each of the one or more protocol layers comprises determining a field length in the header format of each of a plurality of the protocol data units for each of the one or more protocol layers for carrying a sequence number, and determining a sequence number of each of a plurality of the protocol data units for the one or more protocol layers, the sequence number providing an indication identifying the protocol data units amongst a sequence of protocol data units.

Paragraph 11. A method of paragraph 10, wherein the determining the field length in the header format includes setting the field length to zero in accordance with radio communications conditions of the wireless access interface.

Paragraph 12. A method of any of paragraphs 1 to 9, wherein the transmitting entity is one of a user equipment forming a communications device and a radio network infrastructure equipment.

Paragraph 13. A method of training by machine learning a model for selecting a header format for formatting data for transmission by a transmitting entity to a receiving entity in a wireless communications network, the method comprising:

a) selecting a value one or more input parameters, b) selecting a header format for one or more protocol data units formed for each of one or more protocol layers for transmitting a portion of received data via the one or more protocol layers, c) based on the value of the input parameters, evaluating a loss function for data transmitted in accordance with the selected header formats for the one or more protocol data units for each of the one or more protocol layers, d) repeating steps b) and c) for different selected header formats, e) determining, based on the loss function, preferred header formats corresponding to the determined input parameters, repeating the steps a)-e) for different selected input parameter values to determine preferred header formats for the one or more protocol data units for each of the one or more protocol layers corresponding to the different selected input parameter values, and storing on a computer readable medium a representation of a correspondence between the determined preferred header formats and the different selected input parameters.

Paragraph 14. A method according to paragraph 13, wherein the evaluating the loss function comprises determining a total number of transmitted bits per successfully transmitted bit of user data and determining the preferred header formats comprises selecting the header formats for which the loss function is minimized.

Paragraph 15. A method according to paragraph 13 or paragraph 14, wherein the input parameters comprise one or more of a radio condition associated with a wireless link between the transmitting entity and the receiving entity, a service requirement associated with the portion of the data, a quantity of data in the portion of the data, a mobility status of the transmitting entity relative to the receiving entity, and a position of the transmitting entity.

Paragraph 16. A communications device operating in a wireless communications network, the communications device comprising transmitter circuitry configured to transmit signals via a wireless access interface of the wireless communications network,
receiver circuitry configured to receive signals transmitted via the wireless access interface, and
controller circuitry configured
to receive data for transmission via the wireless access interface of the wireless communications network,
to divide the data into portions for transmission,
to form, from each portion of data, for each of one or more protocol layers, one or more protocol data units, the one or more protocol data units being formed for each layer according to a protocol applied by the layer for transmitting the protocol data unit and each of the protocol data units for each layer includes a header, and
to control the transmitter circuitry to transmit the data via the wireless access interface by processing each of the one or more protocol data units via each of the one or more protocol layers, wherein the controller circuitry is configured to form from each portion of the data for each of the one or more protocol layers the one or more protocol data units by
determining a value of one or more input parameters,
determining a header format for each of the one or more protocol layers based on the value of each of the one or more input parameters, and
forming the one or more protocol data units for each of the one or more protocol layers in accordance with each of the determined header formats, and the controller circuitry is configured to control the transmitter circuitry to transmit the one or more protocol data units for each of the one or more protocols to the receiving entity, and the determining the value of the one or more input parameters and the determining the header format for the one or more protocol data units of each of the one or more protocol layers are performed dynamically for each of the portions of data to be transmitted.

Paragraph 17. A processor circuitry configured by executable instructions to perform the method according to any of paragraphs 13 to 15.

Paragraph 18. An infrastructure equipment forming part of a wireless communications network, the infrastructure equipment comprising
transmitter circuitry configured to transmit signals via a wireless access interface of the wireless communications network,
receiver circuitry configured to receive signals transmitted via the wireless access interface, and
controller circuitry configured
to receive data for transmission via the wireless access interface of the wireless communications network,
to divide the data into portions for transmission,
to form, from each portion of data, for each of one or more protocol layers, one or more protocol data units, the one or more protocol data units being formed for each layer according to a protocol applied by the layer for transmitting the protocol data unit and each of the protocol data units for each layer includes a header, and
to control the transmitter circuitry to transmit the data via the wireless access interface by processing each of the one or more protocol data units via each of the one or more protocol layers, wherein the controller circuitry is configured to form from each portion of the data for each of the one or more protocol layers the one or more protocol data units by
determining a value of one or more input parameters,
determining a header format for each of the one or more protocol layers based on the value of each of the one or more input parameters, and
forming the one or more protocol data units for each of the one or more protocol layers in accordance with each of the determined header formats, and the controller circuitry is configured to control the transmitter circuitry to transmit the one or more protocol data units for each of the one or more protocols to the receiving entity, and the determining the value of the one or more input parameters and the determining the header format for the one or more protocol data units of each of the one or more protocol layers are performed dynamically for each of the portions of data to be transmitted.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] 3GPP TS 38.300 v. 15.2.0 "NR; NR and NG-RAN Overall Description; Stage 2 (Release 15)", June 2018
[2] Holma H. and Toskala A, "LTE for UMTS OFDMA and SC-FDMA based radio access", John Wiley and Sons, 2009
[3] 3GPP TS 38.323 v. 15.6.0 "NR; Packet Data Convergence Protocol (PDCP) specification (Release 15)"
[4] 3GPP TS 37.324 v. 1.5.0 "E-UTRA and NR; Service Data Adaptation Protocol (SDAP) specification (Release 15)"
[5] 3GPP TS 38.322 v. 15.5.0 "NR; Radio Link Control (RLC) protocol specification (Release 15)"
[6] Dalman E, Parkvall S. and Skold J., "5G NR The next generation wireless access technology", Academic Press, 2018

What is claimed is:

1. A method of transmitting data by a transmitting entity in a wireless communications network to a receiving entity, the method comprising:
receiving, at the transmitting entity, data for transmission via a wireless access interface of the wireless communications network,
dividing the data into portions for transmission,
forming from each portion of data for each of one or more protocol layers one or more protocol data units, the one or more protocol data units being formed for each layer according to a protocol applied by the layer for transmitting the protocol data unit and each of the protocol data units for each layer including a header,
transmitting the data via the wireless access interface by processing each of the one or more protocol data units via each of the one or more protocol layers, wherein the forming from each portion of the data for each of the one or more protocol layers the one or more protocol data units comprises:
determining a value of one or more input parameters,
determining using a model trained using machine learning for selecting header formats, a header format for each of the one or more protocol layers based on the value of each of the one or more input parameters, and
forming the one or more protocol data units for each of the one or more protocol layers in accordance with each of the determined header formats, and transmitting the one or more protocol data units for each of the one or more protocols to the receiving entity,
wherein the determining the value of the one or more input parameters and the determining the header format for the one or more protocol data units of each of the one or more protocol layers being performed dynamically for each of the portions of data to be transmitted.

2. The method according to claim 1, wherein the input parameters comprise one or more of:
a radio condition associated with a wireless link between the transmitting entity and the receiving entity,
a service requirement associated with the portion of the data,
a quantity of data in the portion of the data,
a mobility status of the transmitting entity relative to the receiving entity, and
a position of the transmitting entity.

3. The method according to claim 1, wherein determining the header format for a protocol layer comprises determining a number of bits to be used in the header to represent one or more of a sequence number, a logical channel identifier, a segment offset, and a quality of service flow identifier.

4. The method according to claim 1, wherein the determining the header format for each of the one or more protocol layers based on the value of each of the one or more input parameters comprises;
determining a value of a format indicator to indicate the determined header format for each of the one or more protocol layers, and
transmitting an indication of the format indicator with the one or more protocol data units for each protocol layer.

5. The method according to claim 1, wherein each header format is selected from a plurality of predetermined header formats for the protocol layer.

6. The method according to claim 1, wherein
the one or more protocol layers comprise at least two protocol layers, and
the determining the header format for each of the one or more protocol layers comprises selecting the header formats for each of protocol layers jointly.

7. The method according to claim 1, wherein the one or more protocol layers comprise one or more of a service data adaptation protocol layer, a packet data convergence protocol layer, a radio link control layer, and a medium access control layer.

8. The method according to claim 1, wherein the determining the one or more input parameters includes receiving an indication of an input parameter from the receiving entity.

9. The method of claim 1, wherein the determining the header format for of the one or more protocol data units for each of the one or more protocol layers comprises:
determining a field length in the header format of each of a plurality of the protocol data units for each of the one or more protocol layers for carrying a sequence number, and
determining a sequence number of each of a plurality of the protocol data units for the one or more protocol layers, the sequence number providing an indication identifying the protocol data units amongst a sequence of protocol data units.

10. The method of claim 9, wherein the determining the field length in the header format includes setting the field length to zero in accordance with radio communications conditions of the wireless access interface.

11. The method of claim 1, wherein the transmitting entity is one of a user equipment forming a communications device and a radio network infrastructure equipment.

12. A method, comprising:
training, by machine learning, a model for selecting a header format for formatting data for transmission by a transmitting entity to a receiving entity in a wireless communications network, the the training including:
a) selecting a value one or more input parameters,
b) selecting a header format for one or more protocol data units formed for each of one or more protocol layers for transmitting a portion of received data via the one or more protocol layers,
c) based on the value of the input parameters, evaluating a loss function for data transmitted in accordance with the selected header formats for the one or more protocol data units for each of the one or more protocol layers,
d) repeating steps b) and c) for different selected header formats,
e) determining, based on the loss function, preferred header formats corresponding to the determined input parameters,
repeating the steps a)-e) for different selected input parameter values to determine preferred header formats for the one or more protocol data units for each of the one or more protocol layers corresponding to the different selected input parameter values, and
storing on a computer readable medium a representation of a correspondence between the determined preferred header formats and the different selected input parameters.

13. The method according to claim 12, wherein
the evaluating the loss function comprises determining a total number of transmitted bits per successfully transmitted bit of user data, and
the determining the preferred header formats comprises selecting the header formats for which the loss function is minimized.

14. The method according to claim 12, wherein the input parameters comprise one or more of:
a radio condition associated with a wireless link between the transmitting entity and the receiving entity,
a service requirement associated with the portion of the data,
a quantity of data in the portion of the data,
a mobility status of the transmitting entity relative to the receiving entity, and
a position of the transmitting entity.

15. A communications device operating in a wireless communications network, the communications device comprising:
transmitter circuitry configured to transmit signals via a wireless access interface of the wireless communications network,
receiver circuitry configured to receive signals transmitted via the wireless access interface, and
controller circuitry configured:
to receive data for transmission via the wireless access interface of the wireless communications network,
to divide the data into portions for transmission,
to form, from each portion of data, for each of one or more protocol layers, one or more protocol data units, the one or more protocol data units being formed for each layer according to a protocol applied by the layer for transmitting the protocol data unit and each of the protocol data units for each layer including a header, and
to control the transmitter circuitry to transmit the data via the wireless access interface by processing each of the one or more protocol data units via each of the one or more protocol layers, wherein the controller circuitry is configured to form from each portion of the data for each of the one or more protocol layers the one or more protocol data units by:
- determining a value of one or more input parameters,
- determining, using a model trained using machine learning for selecting header formats, a header format for each of the one or more protocol layers based on the value of each of the one or more input parameters, and
- forming the one or more protocol data units for each of the one or more protocol layers in accordance with each of the determined header formats, the controller circuitry is configured to control the transmitter circuitry to transmit the one or more protocol data units for each of the one or more protocols to the receiving entity, and the determining the value of the one or more input parameters and the determining the header format for the one or more protocol data units of each of the one or more protocol layers are performed dynamically for each of the portions of data to be transmitted.

* * * * *